United States Patent
Johnston et al.

(10) Patent No.: US 9,302,565 B2
(45) Date of Patent: Apr. 5, 2016

(54) CIRCULATION FOR PRESSURE LOSS EVENT

(71) Applicant: FORD GLOBAL TECHNOLOGIES, LLC, Dearborn, MI (US)

(72) Inventors: William S. Johnston, South Lyon, MI (US); Manfred Koberstein, Troy, MI (US); Steven L. Lambert, Washington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 14/299,251

(22) Filed: Jun. 9, 2014

(65) Prior Publication Data
US 2015/0352926 A1 Dec. 10, 2015

(51) Int. Cl.
| B60H 1/32 | (2006.01) |
| B60H 1/00 | (2006.01) |
| B60K 11/06 | (2006.01) |
| B60K 11/02 | (2006.01) |
| B60K 11/08 | (2006.01) |

(52) U.S. Cl.
CPC .......... *B60H 1/3225* (2013.01); *B60H 1/00978* (2013.01); *B60K 11/02* (2013.01); *B60K 11/06* (2013.01); *B60K 11/085* (2013.01)

(58) Field of Classification Search
CPC .. B60H 1/3225; B60H 1/00978; B60K 11/08; B60K 11/085; B60K 11/06
See application file for complete search history.

(56) References Cited

U.S. PATENT DOCUMENTS

| 4,561,261 A * | 12/1985 | Kornrumpf ............. G01L 9/007 |
| | | 307/118 |
| 4,663,608 A * | 5/1987 | Kelly ....................... G01K 5/42 |
| | | 200/83 C |
| 6,085,531 A | 7/2000 | Numoto et al. |
| 6,308,664 B1 | 10/2001 | Ambros |
| 6,644,047 B2 | 11/2003 | Taira et al. |
| 7,498,926 B2 | 3/2009 | Browne et al. |
| 2006/0095178 A1 | 5/2006 | Guilfoyle et al. |

(Continued)

FOREIGN PATENT DOCUMENTS

| GB | 2131150 A | 6/1984 |
| JP | 2010132182 A * | 6/2010 ............. B60K 11/04 |

(Continued)

OTHER PUBLICATIONS

"From Mind to Motion"; Sonceboz SA.

*Primary Examiner* — Faye M Fleming
(74) *Attorney, Agent, or Firm* — Raymond Coppiellie; Brooks Kushman P.C.

(57) ABSTRACT

An exemplary vehicle is disclosed having a compressible fluid system including at least one sensor configured to determine a fluid pressure present within the compressible fluid system, and a circulator configured to circulate air in the engine compartment. The vehicle is configured to activate the circulator in response to a decrease in the fluid pressure, and in some approaches may also open a grill shutter or other fluid passage into the engine compartment. Exemplary methods may include providing a circulator configured to selectively circulate airflow, e.g., into an engine compartment of a vehicle, and detecting a fluid pressure decrease within a compressible fluid system in the engine compartment. The circulator may be activated to circulate air in the engine compartment in response to at least the detected fluid pressure decrease.

17 Claims, 2 Drawing Sheets

(56) References Cited

U.S. PATENT DOCUMENTS

| | | | |
|---|---|---|---|
| 2008/0000445 A1* | 1/2008 | Kim | F02D 41/0025 123/295 |
| 2008/0053129 A1* | 3/2008 | Follette | B60H 1/00371 62/244 |
| 2011/0132014 A1* | 6/2011 | Eisenhour | B60H 1/3216 62/228.1 |
| 2013/0186377 A1* | 7/2013 | Ryan | F01P 3/12 123/568.12 |

FOREIGN PATENT DOCUMENTS

| | | |
|---|---|---|
| KR | 0167959 | 1/1999 |
| WO | WO-01/46570 A1 | 6/2001 |

* cited by examiner

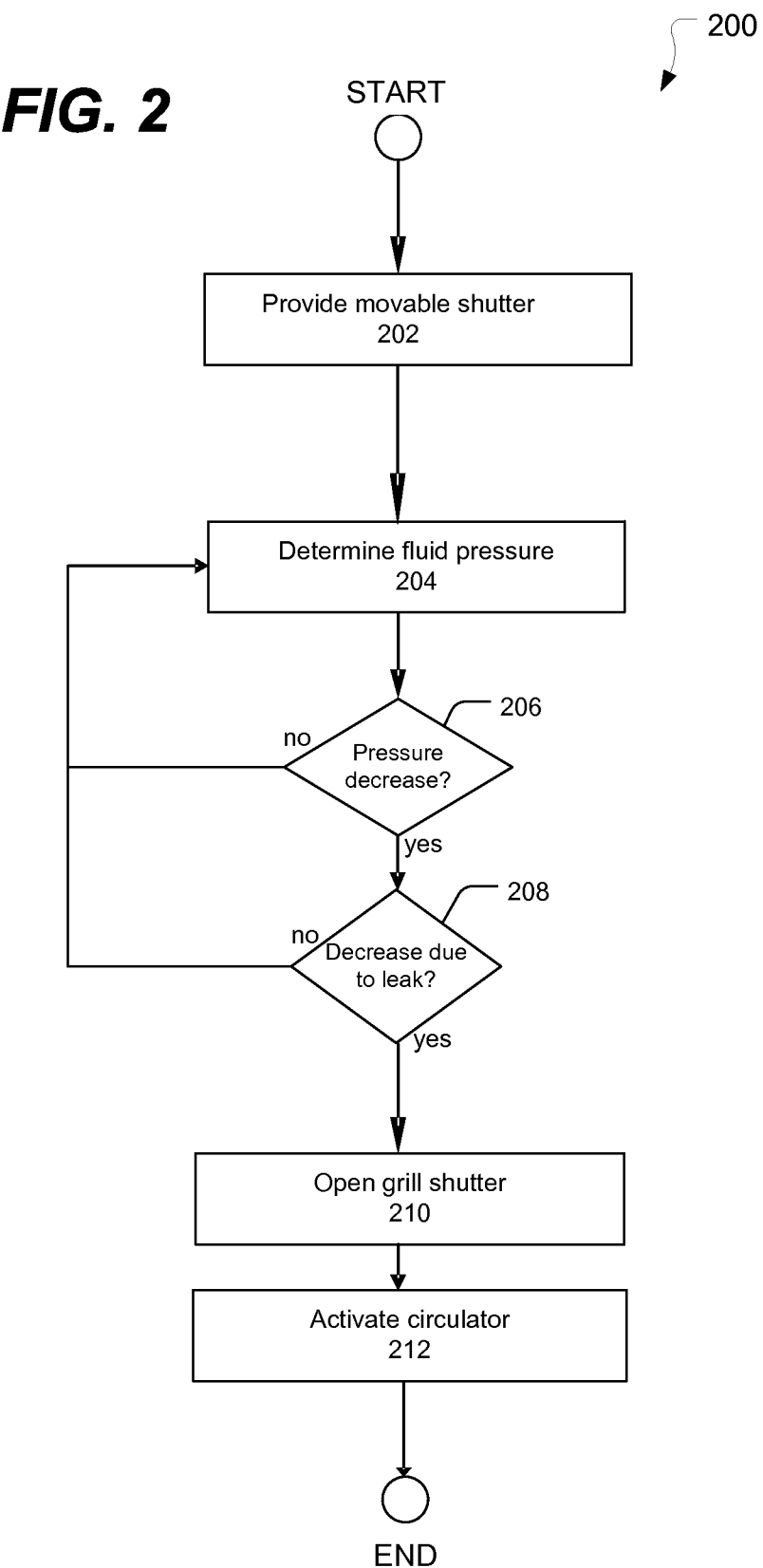

CIRCULATION FOR PRESSURE LOSS EVENT

BACKGROUND

Active grill shutters selectively open apertures in a vehicle grill to facilitate fluid communication of an engine compartment with ambient surroundings of a vehicle. For example, certain driving conditions may call for restricting front end airflow when maximum cooling capacity is not needed. By closing the active grill shutter(s), front end airflow is greatly reduced.

When a leak in the air conditioning system is present, the lack of front end airflow resulting from the closed active grill shutter will reduce air circulation within the engine compartment. For example, during a crash or any other event causing a sudden loss of refrigerant from the air conditioning system, such as running over a foreign object, a pothole, or if a foreign object such as gravel, stones, or other debris strike parts of the refrigerant system such as the condenser, coolant may be suddenly leaked into the engine bay and/or from the vehicle. Leaking refrigerant may result in a strong odor, and in some cases may be a safety risk, e.g., if the refrigerant is flammable. While active grill features in some vehicles provide an active grill feature that responds to certain driving events, known approaches do not address the above safety concerns, e.g., after a sudden loss of refrigerant. Moreover, other fluid systems of the vehicle also typically do not have mechanisms for detecting a sudden loss of fluid, e.g., vehicle fuel, brake fluid, transmission fluid, etc., that is undesirable.

Accordingly, there is a need for a vehicle that addresses the above disadvantages.

SUMMARY

Exemplary illustrations are provided herein of a vehicle having at least one circulator configured to selectively circulate airflow within a vehicle compartment, and a compressible fluid system including at least one sensor configured to determine a fluid pressure present within the compressible fluid system. The vehicle may be configured to activate the circulator in response to a decrease in the fluid pressure.

Exemplary grill assemblies may include at least one circulator configured to selectively circulate airflow within the vehicle compartment, and a processor configured to determine a fluid pressure present within a compressible fluid system associated with the grill assembly. The processor may be further configured to activate the circulator in response to a decrease in the fluid pressure.

Exemplary methods are also disclosed, and may include providing at least one circulator configured to selectively circulate airflow within a compartment of a vehicle, and detecting a fluid pressure decrease within a compressible fluid system in the engine compartment. The methods may further include activating the circulator to circulate air in the engine compartment in response to at least the detected fluid pressure decrease.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIG. 2 is a process flow diagram illustrating an exemplary method, according to an exemplary illustration.

DETAILED DESCRIPTION

Figure 1:
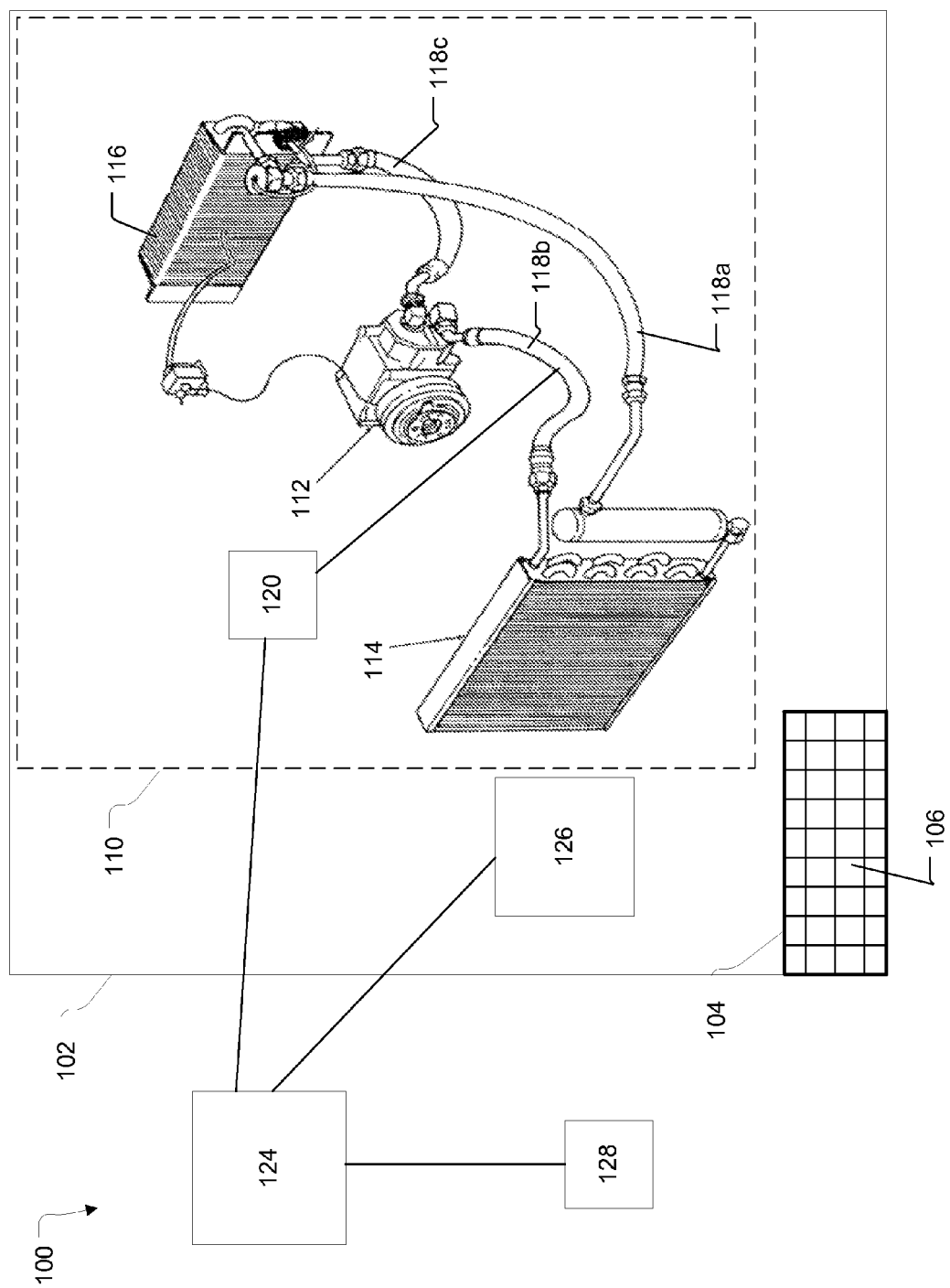
FIG. 1 is an exemplary schematic illustration of a vehicle including a grill assembly, according to one exemplary approach.

Turning now to FIG. 1, a schematic illustration is shown of a vehicle 100 having a vehicle compartment 102. In one example, the vehicle compartment 102 is an engine compartment. The vehicle compartment 102 includes a compressible fluid system 110. The compressible fluid system 110 may be an air-conditioning system having a compressor configured to selectively compress a fluid such as a refrigerant. Any compressible fluid system may be employed that is convenient. Merely as examples, a clutch cycling orifice tube (CCOT) system comprising a high-pressure side and a low pressure side within the system may be employed. In other exemplary approaches, a variable orifice system may be employed.

While the vehicle 100 is described as having an vehicle compartment 102 containing the compressible fluid system 110, exemplary systems and methods may be used in conjunction with other enclosures of the vehicle 100 for a compressible fluid system. In other words, exemplary systems may employ a compressible fluid system enclosed in vehicle compartment 102 or any other enclosure that is convenient. Nevertheless, the exemplary illustrations discussed below are generally directed to a vehicle 100 having an vehicle compartment 102 which contains the compressible fluid system 110.

The vehicle compartment 102 may generally contain any other systems of the vehicle 100 that are convenient. Merely as examples, the engine compartment may contain an internal combustion engine or any other type of engine configured to provide motive force for the vehicle 100. Alternatively or in addition, the vehicle compartment 102 may contain a transmission or other systems for facilitating vehicle operation. Additionally, the vehicle compartment 102 may be generally enclosed in any manner that is convenient, e.g., with a hood (not shown in FIG. 1).

The vehicle compartment 102, while not necessarily being fluid tight with respect to the ambient atmosphere surrounding vehicle 100, may be generally restrictive of air flow into and out of the vehicle compartment 102. Accordingly, the vehicle 100 may further comprise a grill assembly 104 for providing a fluid pathway into and out of the vehicle compartment 102. For example, vehicle 100 may have a grill assembly 104 positioned at a forward end of the vehicle 100 and or, the vehicle compartment 102. The grill assembly 104 may be generally restrictive or permissive with respect to air flow into and out of the vehicle compartment 102. Accordingly, air flow into and out of the vehicle compartment 102 may generally be influenced by a shape, size, or other features are the grill assembly 104.

The exemplary grill assembly 104 may include one or more movable shutters 106. The shutters 106 may be configured to be selectively opened and closed to alter airflow characteristics of the grill assembly 104. For example, during low-speed operation of the vehicle 100, additional cooling capacity with respect to an engine (not shown) of the vehicle 100 may be desired. During such operations, one or more shutters 106 may be generally open to generally freely permit airflow through the shutters 106 of the grill assembly 104. By contrast, at higher speeds, e.g. highway cruising speeds, it may be relatively more desirable to limit airflow into the vehicle compartment 102 in order to enhance vehicle aerodynamics. More specifically, at highway cruising speeds air pressure along a front of a vehicle may be increased as a result of the speed of the vehicle, reducing the amount of surface area along the front of the vehicle that is needed in order to permit a given amount of airflow into the vehicle compartment 102. Moreover, maximum cooling capacity with respect to the engine of the vehicle 100 may not be needed at higher speeds such as highway cruising speeds. Accordingly, the movable shutters 106 may generally facilitate customizing airflow through the grill assembly 104 to provide different airflow characteristics of the grill assembly 104 to suit a variety of vehicle operating conditions.

As noted above, the compressible fluid system 110 may take the form of an air conditioning system in some exemplary approaches. Exemplary air-conditioning systems may employ a fluid refrigerant that is selectively compressed and expanded in order to provide cooling to interior of the vehicle 100. Exemplary refrigerants may include, merely as examples, R22 refrigerant, R134a refrigerant, R1234yf refrigerant, or any other fluid used in a device used to provide cooling to the passenger compartment of a vehicle.

As shown in FIG. 1, compressible fluid system 110 generally includes a compressor 112, a vehicle radiator 114, an evaporator 116, and fluid lines 118, which generally connect these components and allow refrigerant to be circulated through the system 110. Compressor 112 may be configured to selectively compress a fluid, e.g., refrigerant, in order to provide cooling to an interior of the vehicle 100. Evaporator 112 generally facilitates evaporation of compressed fluid, e.g., refrigerant, to provide cooling effect by drawing heat from surrounding ambient air.

The vehicle 100 may also include a circulator 126. The circulator 126, as shown in FIG. 1, is included within the vehicle compartment 102. The circulator 126 is generally configured to circulate airflow within the vehicle compartment 102. In one exemplary illustration, the circulator 126 is a radiator fan positioned within the vehicle compartment 102 adjacent to radiator 114. Accordingly, the circulator 126 may be generally employed by the vehicle 100 to selectively provide increased airflow within the vehicle compartment 102. The circulator 126 may be selectively activated in order to provide enhanced cooling within the vehicle compartment 102, e.g., during particularly strenuous duty cycles associated with the vehicle 100, merely as an example.

The vehicle 100 may further comprise a pressure sensor 120. The pressure sensor 120 may generally facilitate detection of fluid pressure within any part of the compressible fluid system 110 that is convenient. The pressure sensor 120 is in communication with the vehicle processor 124. In one exemplary illustration, the processor 124 is a control module of the vehicle 100, e.g., an engine control module. Pressure sensor 120, while shown separate from the components of the compressible fluid system 110, may alternatively be integrated directly with any part of the compressible fluid one system 110. Accordingly, while sensor 120 is generally discussed herein as a separate component, the concepts described herein may be equally applicable to systems or vehicles where a sensor 120 is integrated directly with one of the components of the compressible fluid system 110, e.g., the compressor 112.

In some exemplary approaches, the processor 124 may also be in communication with a crash sensor 128 of the vehicle 100. The crash sensor 128 may generally facilitate detection of a crash event associated with vehicle 100. Merely as one example, the crash sensor 128 may comprise an accelerometer or other hardware configured to detect an acceleration or deceleration typical of the crash events that may be detected by the processor 124 of the vehicle 100. In other examples, e.g., where a system response is not tied to detection of a crash event, a crash sensor 128 may not be needed, at least in conjunction with determining whether a system response is appropriate.

Turning now to FIG. 2, an exemplary process 200 is illustrated for operating a compressible fluid system, e.g., in a vehicle. Process 200 may generally begin at block 202, where at least one movable shutter configured to selectively permit airflow into an engine compartment of the vehicle is provided. For example, as discussed above, a movable shutter 106 may be provided within a grill assembly 104 of the vehicle 100. The movable shutter may be positioned in any manner that is convenient. For example, as described above the movable shutter may be positioned within a grill assembly 104 positioned at a forward and of the vehicle compartment 102 and/or the vehicle 100. Process 200 may then proceed to block 204.

At block 204, a fluid pressure associated with a compressible fluid system is determined. For example, as described above, a compressible fluid system 110 included in the vehicle 100 may be an air conditioning system relying upon a selectively compressible refrigerant used to provide cooling to interior portion of the vehicle 100. The processor 124 may generally monitor fluid pressure within the compressible fluid system 110 and/or any component thereof. In one exemplary approach, a pressure sensor 120 is provided, which detects fluid pressure within the compressible fluid system 110. Fluid pressure within the compressible fluid system 110 may generally be constantly monitored over time. Processed 200 may then proceed to block 206.

At block 206, process 200 may query whether there has been a pressure decrease within the compressible fluid system 110. If a pressure decrease is measured within the compressible fluid system 110, process 200 may proceed to block 208. If no decrease has been noticed by system 110, process 200 may proceed back to block 204. Accordingly, process 200 may generally continuously query whether a pressure decrease has occurred within the compressible fluid system 110.

Proceeding to block 208, process 200 may query whether the pressure decrease detected at block 206 is due to a leak in the compressible fluid system 110. If a leak has been detected within the compressible fluid system 110, process 200 may proceed to block 210. Alternatively, if any decrease in pressure is determined to be not the result of a leak within the compressible fluid system 110, process 200 may proceed back to block 204.

More specifically, pressure decreases or other variations within the compressible fluid system 110 may occur for a variety of reasons without being caused by a leak within the compressible fluid system 110. Merely as examples, it may be necessary to distinguish a decrease in fluid pressure due to a leak from a decrease due to pressure fluctuations occurring within the compressible fluid system during normal operation. For example, during activation of the compressible fluid system 110, e.g., when air conditioning is turned on, pressure may fluctuate as the compressor 112 initiates operation and increases pressure of refrigerant present in the system. As another example, where an automatic climate control system is employed in a vehicle, pressure variations may occur due to a change in ambient temperature outside the vehicle, resulting in the need for the compressible fluid system to increase output, e.g., to provide a greater amount of cooling to the vehicle.

A fluid systems may experience normal pressure variations, e.g., within the refrigerant loop of an air conditioning system. Some variations in the pressure changes may be "normal," while others that are not typical of ordinary operation may be distinguished from normal conditions. Non-normal or other conditions indicating loss of fluid may include leaks, or other extreme usage conditions where we would circulation of engine compartment air may be desired to mitigate a fluid leak in the engine compartment. In some exemplary approaches, a pressure of the fluid, e.g., refrigerant, will generally have a lower limit which the fluid pressure physically cannot fall below at a given ambient temperature during ordinary operating conditions. If the fluid pressure falls below this lower limit, there is no other condition, other than a leak that can cause this. Accordingly, this may be one factor used to determine the presence of a leak in the system.

Accordingly, the vehicle 100 may generally discriminate between pressure fluctuations of the compressible fluid system 110 inherent in normal operation and pressure fluctuations indicative of a leak in the system. The vehicle may therefore more accurately determine whether a leak has occurred within the compressible fluid system 110.

In some examples, process 200 may query whether a crash event has occurred in determining whether a fluid leak has occurred. For example, as noted above vehicle 100 may be equipped with a processor 124 in communication with a crash sensor 128. When a crash event is detected, e.g., by detecting a characteristic deceleration associated with the vehicle 100, the detection of the crash event may be used to influence whether a system response occurs, e.g., opening of a grill shutter.

However, in some exemplary approaches a system response after a crash of vehicle 100 may not be desired, e.g., if it is desired to deactivate all systems of vehicle 100 after a crash event. Accordingly, in such exemplary illustrations, the vehicle 100 may not rely upon detection of a crash event in determining whether to activate a grill shutter of the vehicle 100.

Proceeding to block 210, in some exemplary illustrations, one or more grill shutters may be opened. For example, a grill shutter may be opened to more freely permit airflow into the vehicle compartment 102. Accordingly, any refrigerant of the compressible fluid system 110 that has leaked out of the system due to a detected leak, may be evaporated from within the engine department more quickly. However, in other exemplary approaches, the grill shutters need not be opened in response to a detected refrigerant or fluid pressure loss. More specifically, in some examples only a circulator is activated in response to a fluid pressure loss. Process 200 may then proceed to block 212.

At block 212, a circulator may be activated in response to the detected crash event and leak in compressible fluid system 110. For example, as described above, a circulator 126 positioned within the vehicle compartment 102 may generally be activated to increase circulation of air within the vehicle compartment 102. The circulation of air within the vehicle compartment 102 may generally facilitate evaporation of any leaking refrigerant from compressible fluid system 110 to the maximum extent possible. Accordingly, any inconvenient or unsafe conditions may be attenuated or eliminated entirely.

In some exemplary approaches, the exemplary methods described herein may employ a computer or a computer readable storage medium implementing the various methods and processes described herein, e.g., process 200. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A vehicle comprising:
    an air conditioning system including at least one sensor configured to determine a fluid pressure present within the air conditioning system;
    a circulator configured to circulate air in a vehicle compartment; and
    at least one sensor configured to detect a vehicle crash event;
    wherein the vehicle is configured to activate the circulator in response to a decrease in the fluid pressure and a detection of a vehicle crash event.

2. The vehicle of claim 1, further comprising at least one movable shutter configured to selectively permit airflow into the vehicle compartment; wherein the vehicle is configured to activate the at least one moveable shutter in response to the decrease in the fluid pressure.

3. The vehicle of claim 2, further comprising a grille positioned at a front end of the vehicle, the at least one movable shutter included in the grille.

4. The vehicle of claim 1, wherein the circulator comprises a radiator fan.

5. The vehicle of claim 1, further comprising a processor configured to detect the decrease in fluid pressure.

6. The vehicle of claim 5, wherein the processor is configured to distinguish the decrease in fluid pressure from pressure fluctuations during normal operation of the air conditioning system.

7. The vehicle of claim 6, wherein the processor is configured to compare a fluid pressure to a lower limit associated with normal operation of the air conditioning system, and activate the circulator based at least in part upon a detection of the fluid pressure below the lower limit.

8. A vehicle system, comprising:
    at least one circulator configured to circulate airflow through a vehicle compartment;
    a grille having at least one movable shutter disposed adjacent to the circulator; and
    a processor configured to determine a fluid pressure present within a compressible fluid system associated with the vehicle and, in response to a decrease in the fluid pressure, open the at least one shutter and activate the circulator.

9. The system of claim 8, wherein the processor is configured to compare a fluid pressure to a lower limit associated with normal operation of the compressible fluid system, and activate the circulator based at least in part upon a detection of the fluid pressure below the lower limit.

10. The system of claim 8, wherein the processor is configured to distinguish the decrease in fluid pressure from pressure fluctuations during normal operation of the compressible fluid system.

11. A method comprising:
    providing at least one circulator configured to circulate airflow within a vehicle compartment;
    positioning a grille having at least one movable shutter at a front end of the vehicle;
    detecting a fluid pressure decrease within a compressible fluid system in the vehicle compartment; and
    activating the circulator and opening the at least one shutter in response to the detected fluid pressure decrease.

12. The method of claim 11, further comprising establishing the circulator as a radiator fan.

13. The method of claim 11, further comprising distinguishing the decrease in fluid pressure from pressure fluctuations occurring during normal operation of the compressible fluid system.

14. The method of claim 13, wherein the pressure fluctuations occurring during normal operation of the compressible fluid system include fluctuations resulting from activation of the compressible fluid system.

15. The method of claim 13, wherein the pressure fluctuations occurring during normal operation of the compressible fluid system include fluctuations resulting from a change in ambient temperature.

16. The method of claim 13, further comprising comparing a fluid pressure to a lower limit associated with normal operation of the compressible fluid system; and activating the circulator based at least in part upon a detection of the fluid pressure below the lower limit.

17. A method comprising:
    providing at least one circulator configured to circulate airflow within a compartment of a vehicle;

detecting a fluid pressure decrease within an air conditioning system in the vehicle compartment;
monitoring the vehicle for a crash event with at least one sensor; and
activating the circulator in response to a crash event detected by the sensor and the detected fluid pressure decrease.

* * * * *